(12) United States Patent
Ritchie

(10) Patent No.: US 10,806,221 B2
(45) Date of Patent: Oct. 20, 2020

(54) BUCKLE GUARD FOR PREVENTING RELEASE

(71) Applicant: Ryan Ritchie, Huntington Beach, CA (US)

(72) Inventor: Ryan Ritchie, Huntington Beach, CA (US)

( * ) Notice: Subject to any disclaimer, the term of this patent is extended or adjusted under 35 U.S.C. 154(b) by 24 days.

(21) Appl. No.: 15/969,726

(22) Filed: May 2, 2018

(65) Prior Publication Data

US 2019/0335861 A1  Nov. 7, 2019

(51) Int. Cl.
*A44B 11/25* (2006.01)
*B60R 22/10* (2006.01)

(52) U.S. Cl.
CPC ......... *A44B 11/2576* (2013.01); *B60R 22/105* (2013.01)

(58) Field of Classification Search
CPC .................................................. A44B 11/2576
See application file for complete search history.

(56) References Cited

U.S. PATENT DOCUMENTS

| | | | |
|---|---|---|---|
| 3,484,908 A | 12/1969 | Lamb | |
| 4,502,194 A | 3/1985 | Morris et al. | |
| 4,624,033 A | 11/1986 | Orton | |
| 4,674,303 A * | 6/1987 | Salcone, II | A44B 11/2576 206/807 |
| 4,675,954 A | 6/1987 | Gullickson | |
| 4,731,912 A | 3/1988 | Boriskie et al. | |
| 4,939,824 A | 7/1990 | Reed | |
| 4,961,251 A | 10/1990 | Smith | |
| 4,987,662 A * | 1/1991 | Haffey | A44B 11/2576 24/633 |
| 5,307,544 A * | 5/1994 | Quarberg | A44B 11/2576 24/579.11 |
| 5,442,840 A | 8/1995 | Ewald | |
| 6,041,480 A * | 3/2000 | White | A44B 11/2576 24/487 |
| 6,431,652 B1 * | 8/2002 | Kennedy | A44B 11/2576 297/464 |
| 6,769,157 B1 | 8/2004 | Meal | |
| 8,393,061 B2 * | 3/2013 | McGlynn | A44B 11/2576 24/198 |
| 8,776,332 B2 * | 7/2014 | Kosh | A44B 11/2511 24/163 K |
| 8,816,839 B1 * | 8/2014 | Rick | F16B 17/00 180/268 |
| 9,646,475 B2 * | 5/2017 | Tanner | B60R 22/48 |
| 2007/0289111 A1 * | 12/2007 | Mandarino | A44B 11/2576 24/633 |

\* cited by examiner

*Primary Examiner* — Joshua T Kennedy

(57) ABSTRACT

A guard that attaches to a buckle included in a safety restraint system. The guard includes a movable cover. In at least one position of the cover, the cover limits access to an external release of the buckle and prevents release of straps from the buckle.

13 Claims, 6 Drawing Sheets

BUCKLE GUARD FOR PREVENTING RELEASE

FIELD OF THE INVENTION

The invention relates to a guard that prevents release of a buckle, and more particularly, a guard that prevents the undesired release of a safety restraint.

BACKGROUND OF THE INVENTION

Every year many avoidable injuries occur due to a lack of proper use of safety restraints. In some instances, the safety restraints are unused. In other instances, a safety restraint is used, but prematurely released prior to an accident. The safety restraints are often prematurely released by curious children or other incapacitated individuals who do not understand the importance of keeping them attached.

Various devices have been created intending to limit premature release of safety restraints. In many examples, a generally tubular sleeve is slipped over the entire buckle to limit access to a release latch of the buckle. Similar examples are constructed as hinged clam shell covers that are closed over the buckle. The halves of the clam shell cover are latched by a releasable latch that may require a tool or sufficient force to unlatch. In many of those devices, a secondary tool is required to access the buckle release through an aperture included in the sleeve. For example, in many instances, a small aperture is included that allows a car key to be inserted to press the release. In other instances, the sleeve is at least partially flexible and constructed so that a predetermined amount of strength is required to flex the sleeve and activate the release. Requiring a tool to release the buckle is one disadvantage of the designs because the tool could become displaced rendering the buckle unreleasable. Another disadvantage of the sleeve designs is that because they cover at least four sides of the buckle, they are limited to buckles that attach to straps on opposite surfaces of the buckle, but many modern safety restraints include multi-point attachments and require access to more than two sides of the buckle. Some sleeve designs are also completely separate components that are required to be slipped over the buckle prior to the safety restraint being latched, and a tongue of the safety restraint is inserted through the sleeve and into the buckle. In those examples, the device may become separate from the buckle, which increases the chance that the device will be lost.

Other devices preventing premature release include covers that wrap around the buckle. In general, those covers are flexible and after they are wrapped around the buckle they are retained in the wrapped configuration using releasable straps. A disadvantage is that the procedure for properly installing the device requires many steps that must be performed properly and the procedure for installing and removing the device is time-consuming.

Devices that are easy to use, are compatible with many different buckle configurations and that remain attached to the buckle when not in use are desired.

SUMMARY OF THE INVENTION

In an embodiment of the present invention, a buckle guard for limiting access to an external release in a buckle housing includes a stationary member, a cover member, and a fastener. The cover member is movably coupled to the stationary member, and defines a lock mechanism that interacts with the stationary member to selectively lock the relative position of the cover member and the stationary member. The fastener fixedly couples the stationary member to the buckle housing. The cover member is movable relative to the stationary member between a first position wherein the cover member is disposed over the external release limiting access to the external release, and a second position wherein the external release is exposed. The lock mechanism releasably fixes the stationary member relative to the cover member in the first position.

In another embodiment, a buckle guard for limiting access to an external release in a buckle housing includes a stationary member, a cover member, a fastener, and an alarm. The cover member is slidably coupled to the stationary member and defines a lock mechanism that interacts with the stationary member to selectively lock the relative position of the cover member and the stationary member. The fastener fixedly couples the stationary member to the buckle housing. The cover member is slidable relative to the stationary member between a first position wherein the cover member is disposed over the external release, limiting access to the external release, and a second position wherein the external release is exposed. The alarm is configured to sound when the cover member is in a position relative to the stationary member between the first position and the second position. The lock mechanism releasably fixes the stationary member relative to the cover member in the first position.

In another embodiment, a buckle guard for limiting access to an external release in a buckle housing includes a stationary member, a cover member, a fastener, and a limit stop. The cover member is slidably coupled to the stationary member and defines a lock mechanism that interacts with the stationary member to selectively lock the relative position of the cover member and the stationary member. The fastener fixedly couples the stationary member to the buckle housing. The cover member is slidable relative to the stationary member between a first position wherein the cover member is disposed over the external release limiting access to the external release, and a second position wherein the external release is exposed. The limit stop is interposed between the stationary member and the cover member and prevents the cover member separating from the stationary member when the cover member is disposed in the second position. The lock mechanism releasably fixes the stationary member relative to the cover member in the first position.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, are to be read in conjunction with the specification and further serve to explain the principles of the invention and to enable a person skilled in the pertinent art to make and use the invention. Throughout the drawings, like reference numerals are used to indicate like parts in the various views, in which.

DETAILED DESCRIPTION

The present invention is directed to a buckle guard for preventing premature release of a buckle that forms a portion of a safety restraint device.

Figure 1:
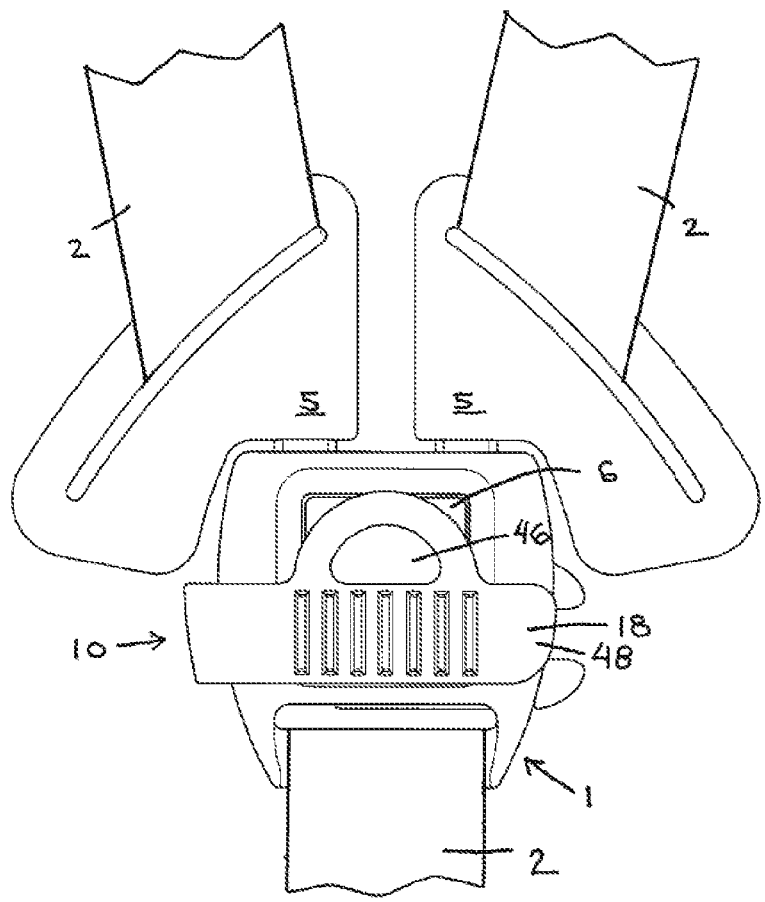
FIG. 1 is a front view of a portion of a safety restraint including the buckle guard of the present invention.

Referring to FIG. 1, a portion of a safety restraint system is illustrated having a buckle guard 10 of the present invention attached thereto. The safety restraint system includes a buckle 1 that selectively couples a plurality of restraint straps 2. The buckle 1 is fixedly coupled to a first strap 2, and selectively coupled to removable second and third straps 3. As shown, the safety restraint system is a multi-point attachment restraint device that includes more than two straps that are coupled to buckle 1. The end of each removable strap 3 includes a tongue member 5 that is received by the buckle 1 and is fixed in the buckle by an internal latch mechanism. The internal latch mechanism is generally spring operated so that when the tongue member 5 is inserted into buckle 1, the tongue is locked in place. An external release 6 is included on buckle 1 that is operatively coupled to the internal latch mechanism to selectively release the internal latch mechanism to allow the tongue members 5 to be released. Generally, the external release 6 may be pressed against the spring mechanism of the internal latch mechanism to activate the release.

Overall, the buckle guard 10 is sized and shaped to minimize the amount of the buckle 1 that is covered in any configuration so that the buckle guard 10 can be utilized universally on different buckle designs. As shown in FIG. 1, the buckle guard 10 is sized and shaped so that the removable straps can be inserted into the buckle 1 when the buckle guard is in any configuration. Additionally, the size and shape of the buckle guard 10 also does not interfere or attach to any of the fixed strap 2 or removable straps 3.

Figure 2:
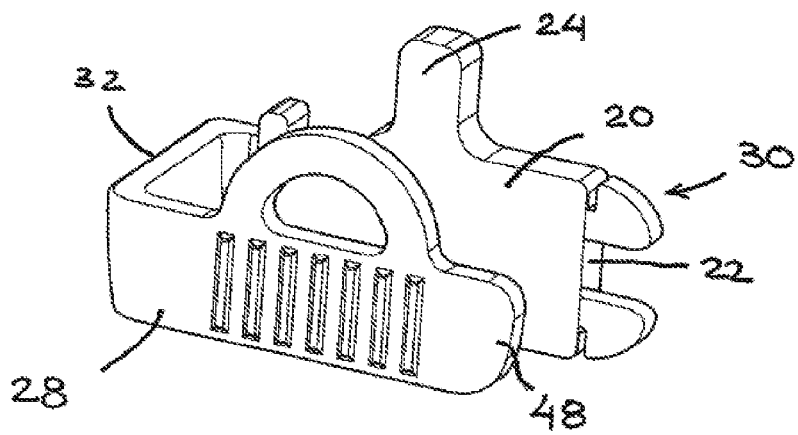
FIG. 2 is a perspective view of the buckle guard of FIG. 1.
Figure 3:
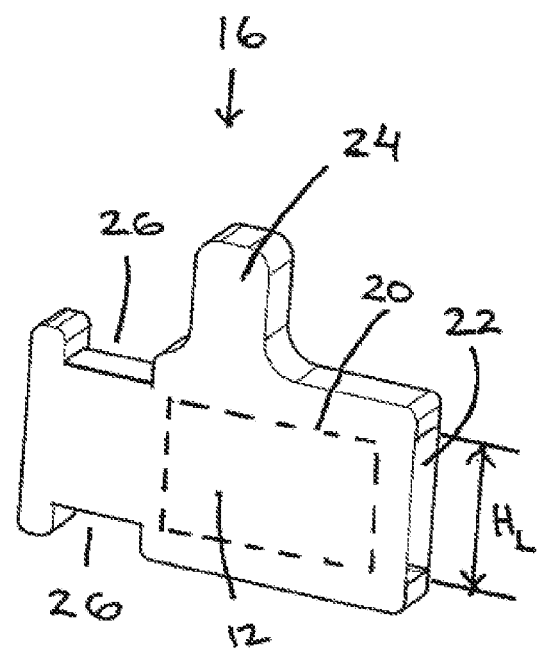
FIG. 3 is a perspective view of a stationary member of the buckle guard of FIG. 1.
Figure 4:
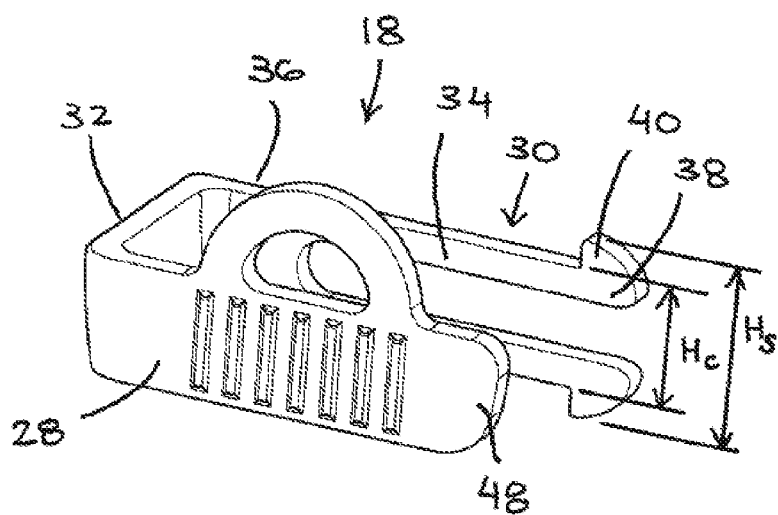
FIG. 4 is a perspective view of a cover member of the buckle guard of FIG. 1.

Referring now to FIGS. 2-4, the buckle guard 10 of the present invention generally includes a stationary member 16 and a cover member 18 that are coupled so that they are able to move relative to each other. In the illustrated embodiment, the cover member 18 is slidably coupled to the stationary member 16 so that when the buckle guard 10 is assembled, the cover member 18 and stationary member 16 are movable between a first position and a second position. The cover member 18 may be selectively locked in the first position, shown in FIGS. 1 and 2. In the first position, the cover member 18 is fully inserted into the stationary member 16 and the cover member 18 is disposed over the external release limiting access to the external release, to prevent premature release such as by a child.

The stationary member 16 is fixed to a housing portion of the buckle 1 that is spaced from the external release 6 by a fastener 12. The fastener 12 may be an adhesive (e.g., double-sided tape, epoxy, etc.), mechanical fasteners, or the stationary member may be formed as an integral part of the buckle 1. In the present embodiment, the stationary member 16 includes a generally tubular body 20 that defines a lumen 22 that receives a portion of the cover member 18 when the buckle guard 10 is assembled. The stationary member 16 also includes a locating feature 24 that assists in proper placement when fixing the stationary member 16 to the buckle 1. The locating feature 24 is a projection that extends from a portion of the tubular body 20 to indicate the proper spacing from an edge of the buckle 1 so that when the cover member 18 is in the first position, it is properly located to limit access to the external release 6. The stationary member 16 also includes a plurality of limit openings 26 that interact with the cover member 18 to prevent the buckle guard 10 from being fully disassembled during use. The limit openings 26 extend through the side wall of the tubular body 20 and intersect the lumen 22.

The cover member 18 is formed by a body member that is generally U-shaped and includes a cover portion 28, a locking mechanism 30, and an extension portion 32 that extends between the cover portion 28 and the locking mechanism 30. The cover portion 28 is sized and shaped to extend over the external release 6 when the buckle guard 10 is installed on buckle 1 and the cover member 18 is in the first position, as shown in FIG. 1. The locking mechanism 30 is spaced from the cover portion 30 by the extension portion 32 which is sized to extend around a side wall of buckle 1 so that the locking mechanism 30 can interact with the stationary member 16, preferably on a side of buckle 1 opposite the external release 6, while the cover portion 28 may be located adjacent the external release 6.

The cover member 18 may also include grip features to make handling of the buckle guard 10 easier for a user. The grip features may include raised or recessed ridges, bumps or texturing. The portions of cover member 18, such as extension portion 32 and cover portion 28, preferably have a height that generally corresponds to an outer height $H_C$ of the flexible arms 34, and the thickness of the portions of the cover member 18 are selected so that they can withstand a maximum force exerted by a child trying to break the cover member 18. Preferably, the extension portion 32 and the cover portion 28 are sized to withstand a force of 15 lbf, and more preferably a force of 20 lbf, applied in any direction.

The components of the buckle guard 10 may be constructed from any material sufficiently strong to resist breaking by a child. Sufficient materials may include non-metallic and metallic materials. Preferably, the components are constructed from a non-toxic material. Examples of suitable materials include polypropylene, polyethylene, ABS, aluminum, stainless steel, etc.

In the illustrated embodiment, the locking mechanism 30 is constructed from a pair of flexible arms 34. Each of the flexible arms 34 includes a fixed end 36 adjacent the extension portion 32 and a free end 38 that is cantilevered from the fixed end 36. Each of the flexible arms 34 includes a limit stop 40 that extends outward from the free end 38. In the non-flexed condition, the outer height $H_C$ of the cover member 18 at the flexible arms 34 is sized to fit and slide in lumen 22 and is preferably about equal to a height of the lumen $H_L$. Also in the non-flexed condition, the limit stops 40 create a local outer height $H_S$ of the limit stops 40 of free ends 36 of the flexible arms 34 and the height $H_S$ is greater than the height of the lumen $H_L$. The flexible arms 34 may be forcibly flexed toward each other to alter the local outer height $H_S$ of the limit stops 40 so that it is less than the height of the lumen $H_L$ allowing the cover member 18 to move relative to the stationary member 16 between the first and second positions, and during assembly and/or disassembly.

The cover member 18 also includes a window 46 defined by an aperture that extends through a portion of the cover member 18. The window 46 allows the external release 6 to be visible when the cover member 18 is in the first position. The size of the window 46 is selected so that it is too small for a child's fingertip to pass through to activate external release 6. Preferably, the size of the window has a maximum dimension that is less than 11.0 mm, and more preferably less than 9.0 mm; and a minimum dimension that is greater than 5.0 mm, and more preferably greater than 7.0 mm.

Figure 5:
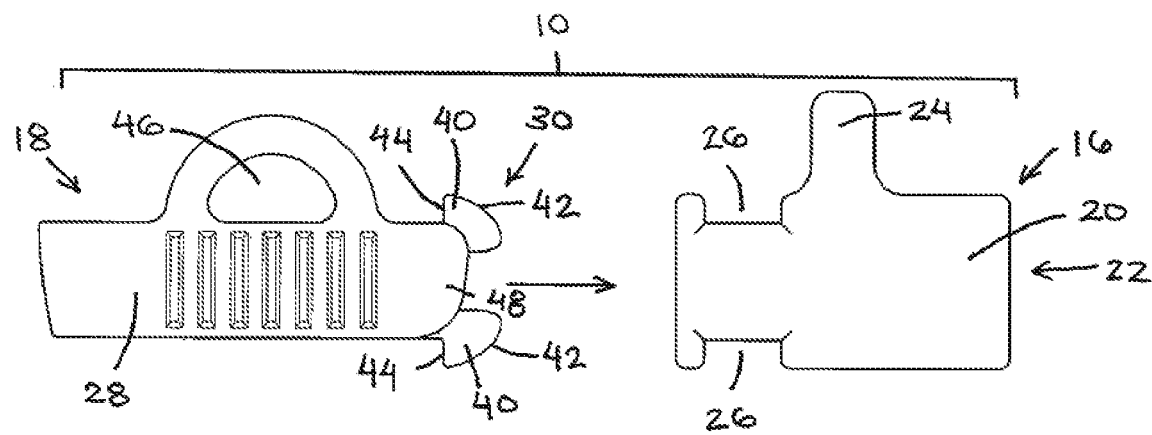
FIG. 5 is an exploded view of the buckle guard of FIG. 1.
Figure 6:
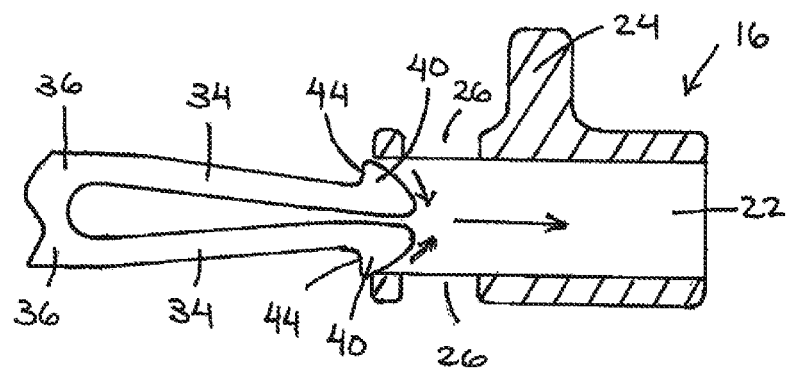
FIG. 6 is a partial cross-sectional view of a portion of the buckle guard of FIG. 1, illustrating a step in the assembly and use of the buckle guard.

Referring to FIGS. 5-10 the assembly and use of the buckle guard 10 will be described. The stationary member 16 and the cover member 18 are constructed as separate parts, as shown in FIG. 5, and as a first step in the assembly of the buckle guard 10, the flexible arms 34 are aligned with a proximal end of the lumen 22 of the stationary member 16. Preferably, before the buckle guard 10 is assembled, the stationary member 16 is fixed to a rear surface of the buckle 1. The stationary member 16 and the cover member 18 are moved toward each other and the free ends 38 of the flexible arms 34 are inserted into the lumen 22. The free ends 38 and the limit stops 40 have an outermost abutment surface 42 that is tapered so that they contact the opening of lumen 22, which forces the flexible arms 34 to flex inward until the flexible arms 34 are sufficiently flexed to enter the proximal end of the lumen 22, as shown in FIG. 6. As an alternative, the free ends and limit stops need not have a tapered abutment surface, and the user may squeeze the flexible arms 34 together until they can be inserted into lumen 22.

Figure 7:
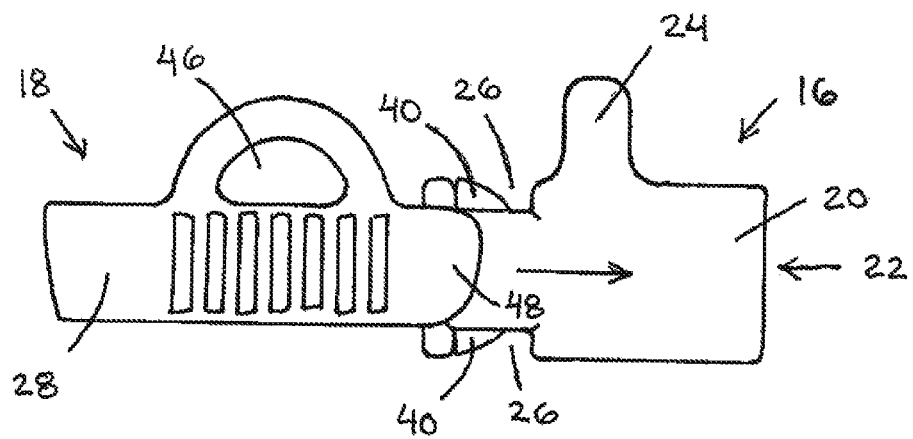
FIG. 7 is a front view of the buckle guard of FIG. 1, illustrating a step in the assembly and use of the buckle guard.
Figure 8:
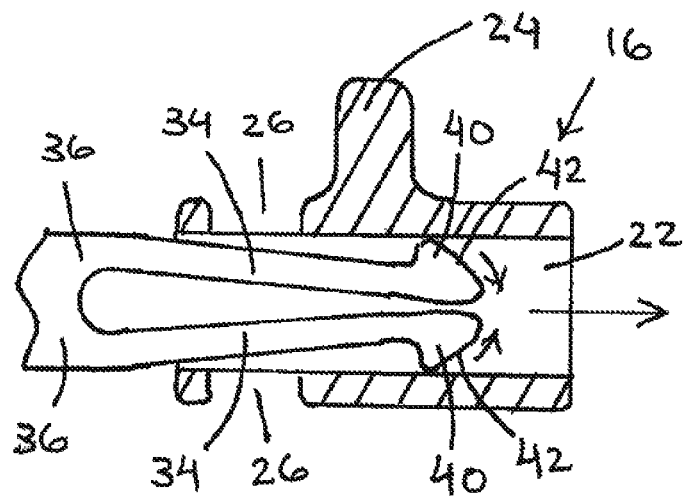
FIG. 8 is a partial cross-sectional view of a portion of the buckle guard of FIG. 1, illustrating a step in the assembly and use of the buckle guard.
Figure 9:
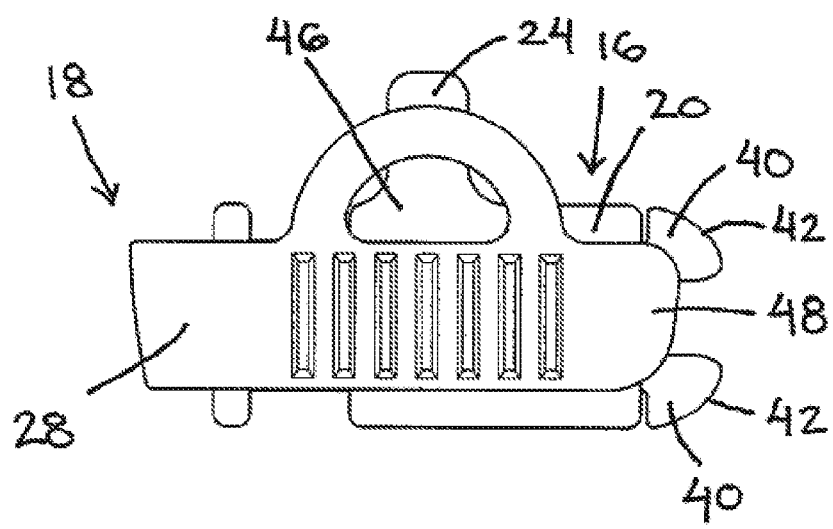
FIG. 9 is a front view of the buckle guard of FIG. 1, illustrating a step in the assembly and use of the buckle guard.
Figure 10:
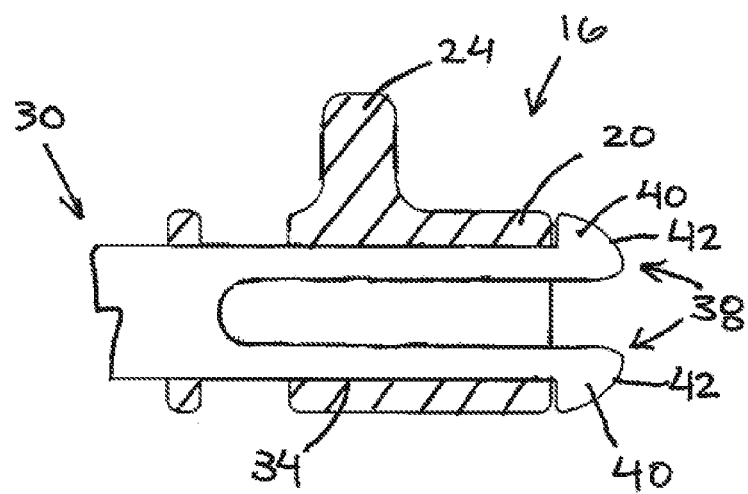
FIG. 10 is a partial cross-sectional view of a portion of the buckle guard of FIG. 1, illustrating a step in the assembly and use of the buckle guard.

Next, the flexible arms 34 are advanced distally, further into lumen 22 until the limit stops 40 are aligned with the limit openings 26 and the flexible arms 34 are free to return to the non-flexed condition, shown in FIG. 7, which corresponds to the second position of the cover member 18. The cover member 18 is then advanced from the second position further into stationary member 16, and as the cover member 18 is advanced further distally into lumen 22, each abutment surface 42 abuts the edge of the respective limit opening 26 and forces the flexible arm 34 to flex inward, as shown in FIG. 8. Finally, the cover member 18 is advanced into the fully inserted position, corresponding to the first position, shown in FIGS. 1, 2 and 9. As the cover member 18 is extended into the fully inserted position, the free ends 38 and limit stops 40 exit a distal end of the lumen 22 and the flexible arms 34 are allowed to return to the non-flexed configuration. Similarly, the cover member 18 may be returned to the second position by a user simply by squeezing the free ends 38 of the flexible arms 34 inward and the sliding the cover member 18 relative to the stationary member 16.

Each of the limit stops also includes a stop surface 44 opposite the abutment surface 42. Each stop surface 44 abuts the distal edge of the lumen 22 when the cover member 18 is in the first position and moved proximally toward the second position with the flexible arms 34 in the non-flexed condition, and the proximal edge of the limit opening 26 when the cover member 18 is in the second position and moved proximally with the flexible arms 34 in the non-flexed condition. The interaction between the stop surface 44 and the stationary member 16 limits movement of the cover member 18 proximally relative to the stationary member 16 in the direction from the first position toward the second position. The stop surface 44 is preferably oriented perpendicular to the direction of movement from the first position toward the second position so that a user is required to flex the flexible arms 34 inward to free the cover member 18 to move from the first position toward the second position, and to move the cover member 18 from the second position to disassemble the buckle guard 10, if desired. Additionally, that design of the limit stops also prevents the cover member 18 from being disassembled from the stationary member 16 during use, because the limit openings 26 receive the limit stops 40 and stop the relative motion before the buckle guard 10 becomes disassembled.

Preferably, in embodiments intended for child restraint systems, the cover member 18 is designed so that it can be broken off by an emergency worker or other adult during an emergency. For example, the cover portion 28 is sized so that a free end 48 overhangs the edge of the buckle 1, and so that it includes a designed in break point adjacent the extension portion 32. The break point is designed to require a predetermined amount of force, i.e., that of a healthy adult or emergency worker, to be broken in the event of an emergency by pulling on the free end 48.

Figure 11:
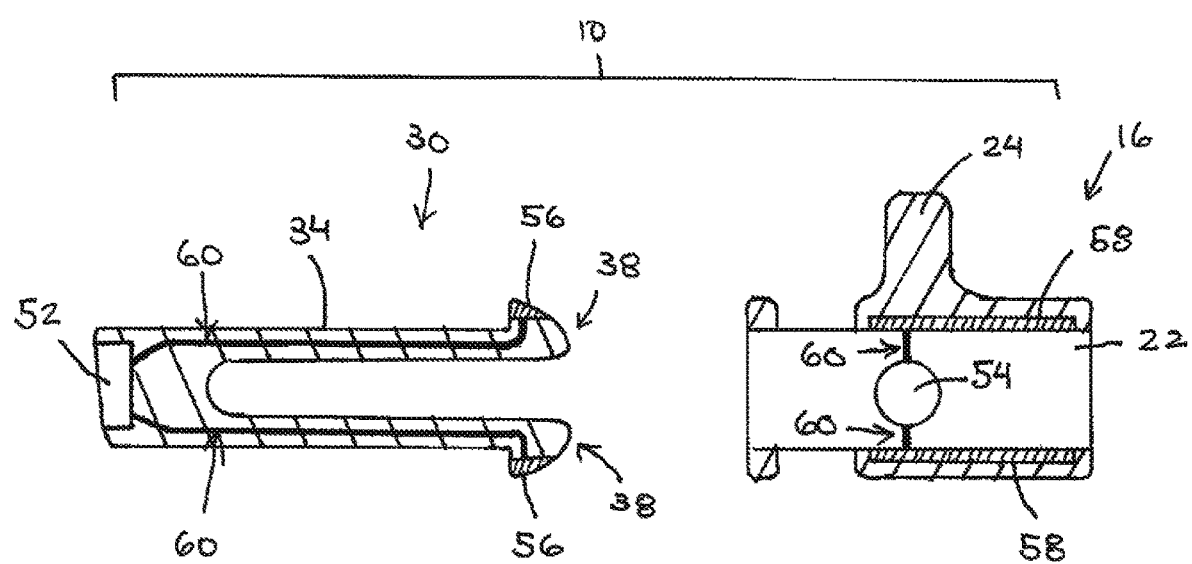
FIG. 11 is an exploded partial cross-sectional view of a portion of the buckle guard of the present invention including an integrated alarm system.

As an additional feature, the buckle guard 10 may include circuitry to provide an alarm if the cover member 18 is moved between the first and second positions, shown in FIG. 11. The circuitry includes conductors 50, a power source 52 such as a battery, and an alarm 54. In particular, a circuit extends across the interface between the stationary member 16 and the cover member 18. The conductors 50 are included on the stationary member 16 and on the cover member 18 and the conductors contact each other when the flexible arms 34 are disposed between the distal end of the lumen 22 and the limit openings 26 to complete the circuit. The conductors 50 include sliding contacts 56 on free ends 38 of flexible arms 34, contact surfaces 58 disposed in the side wall of lumen 22, and elongate conductors 60 such as wires that extend through each of the bodies of stationary member 16 and cover member 18. The elongate conductors 60 connect the power source 52, the alarm 54, the sliding contacts 56 and the contact surfaces 58 to form a complete circuit when the cover member 18 is located between the first and second positions to sound a warning alarm to indicate that the external release 6 has become accessible. The power source 52 and alarm 54 may be incorporated into any portion of the buckle guard 10 and are incorporated so that they are child-safe so that they do not become a choke hazard if removed. Preferably, the power source 52 is coupled to the cover member 18 so that replacement of the power source 52 may be simplified by removing the cover member 18 from the stationary member 16.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A buckle guard for limiting access to an external release in a buckle housing, comprising:
   a stationary member comprising at least one limit opening;
   a cover member comprising a projection having a limit stop, the cover member slidably coupled to the stationary member, wherein the cover member defines a lock mechanism that interacts with the stationary member to selectively lock the relative position of the cover member and the stationary member; and
   a fastener configured to fixedly couple the stationary member to the buckle housing,
   wherein the cover member is slidable relative to the stationary member so that the cover member is configured to translate relative to the stationary member between a first position wherein the cover member is disposed over the external release limiting access to the external release, and a second position wherein the external release is exposed,
   wherein the lock mechanism releasably fixes the stationary member relative to the cover member in the first position, and
   wherein the limit stop of the projection interacts with the limit opening of the stationary member when the cover member is disposed in the second position to prevent the stationary member and the cover member from being fully disassembled during use.

2. The buckle guard of claim 1, wherein the stationary member is a sleeve, wherein the sleeve defines a lumen that receives the projection included on the cover member.

3. The buckle guard of claim 2, wherein the projection comprises a plurality of flexible members.

4. The buckle guard of claim 3, wherein at least one of the flexible members includes a projection extending from a free end of the flexible member, wherein the projection abuts a portion of the stationary member to limit relative motion between the stationary member and the cover member.

5. The buckle guard of claim 1, wherein the cover member includes a window, wherein the window is configured to be disposed adjacent the external release when the cover member is in the first position so that a portion of the external release is exposed through the window.

6. The buckle guard of claim 1, wherein the cover member defines a free end that is configured to overhang an edge of the buckle housing.

7. A buckle guard for limiting access to an external release in a buckle housing, comprising:
   a stationary member comprising at least one limit opening;
   a cover member comprising a projection having a limit stop, the cover member slidably coupled to the stationary member, wherein the cover member defines a lock mechanism that interacts with the stationary member to selectively lock the relative position of the cover member and the stationary member;
   a fastener configured to fixedly couple the stationary member to the buckle housing,
   wherein the cover member is slidable relative to the stationary member so that the cover member is configured to translate relative to the stationary member between a first position wherein the cover member is disposed over the external release limiting access to the external release, and a second position wherein the external release is exposed; and
   an alarm that is configured to sound when the cover member is in a position relative to the stationary member between the first position and the second position,
   wherein the lock mechanism releasably fixes the stationary member relative to the cover member in the first position, and
   wherein the limit stop of the projection interacts with the limit opening of the stationary member when the cover member is disposed in the second position to prevent the stationary member and the cover member from being fully disassembled during use.

8. The buckle guard of claim 7, wherein the stationary member is a sleeve, wherein the sleeve defines a lumen that receives the projection included on the cover member.

9. The buckle guard of claim 8, wherein the projection comprises a plurality of flexible members.

10. The buckle guard of claim 9, wherein at least one of the flexible members includes a projection extending from a free end of the flexible member, wherein the projection abuts a portion of the stationary member to limit relative motion between the stationary member and the cover member.

11. The buckle guard of claim 7, wherein the cover member includes a window, wherein the window is configured to be disposed adjacent the external release when the cover member is in the first position so that a portion of the external release is exposed through the window.

12. The buckle guard of claim 7, wherein the cover member defines a free end that is configured to overhang an edge of the buckle housing.

13. A buckle guard for limiting access to an external release in a buckle housing, comprising:
   a stationary member comprising at least one limit opening;
   a cover member comprising a projection having a limit stop, the cover member slidably coupled to the stationary member, wherein the cover member defines a lock mechanism that interacts with the stationary member to selectively lock the relative position of the cover member and the stationary member;
   a fastener configured to fixedly couple the stationary member to the buckle housing,
   wherein the cover member is slidable relative to the stationary member so that the cover member is configured to translate relative to the stationary member between a first position wherein the cover member is disposed over the external release limiting access to the external release, and a second position wherein the external release is exposed,
   wherein the limit stop of the projection interacts with the limit opening of the stationary member when the cover member is disposed in the second position to prevent the stationary member and the cover member from being fully disassembled during use,
   wherein the lock mechanism releasably fixes the stationary member relative to the cover member in the first position,
   wherein the cover member includes a window,
   wherein the window is configured to be disposed adjacent the external release when the cover member is in the first position so that a portion of the external release is exposed through the window, and wherein the window has a maximum dimension that is less than 11.0 mm.

* * * * *